US012723740B2

(12) United States Patent
Chen et al.

(10) Patent No.: US 12,723,740 B2
(45) Date of Patent: Sep. 1, 2026

(54) TYPE OF LAMP

(71) Applicant: Xiamen Guangpu Electronics Co., Ltd., Xiamen (CN)

(72) Inventors: Jiexuan Chen, Xiamen (CN); Tingxing Zhou, Xiamen (CN); Zhifu Xie, Xiamen (CN); Yuxi Chen, Xiamen (CN); Haiding Su, Xiamen (CN); Guobiao Lin, Xiamen (CN)

(73) Assignee: Xiamen Guangpu Electronics Co., Ltd., Xiamen (CN)

( * ) Notice: Subject to any disclaimer, the term of this patent is extended or adjusted under 35 U.S.C. 154(b) by 50 days.

(21) Appl. No.: 18/754,692

(22) Filed: Jun. 26, 2024

(65) Prior Publication Data

US 2025/0369596 A1 Dec. 4, 2025

(30) Foreign Application Priority Data

May 31, 2024 (CN) ......................... 202421237253.6

(51) Int. Cl.
*F21V 17/16* (2006.01)
*F21S 8/02* (2006.01)
*F21V 15/01* (2006.01)

(52) U.S. Cl.
CPC ............. *F21V 17/164* (2013.01); *F21S 8/026* (2013.01); *F21V 15/01* (2013.01)

(58) Field of Classification Search
CPC ........ F21S 8/026; F21V 15/01; F21V 17/101; F21V 21/04
See application file for complete search history.

(56) References Cited

U.S. PATENT DOCUMENTS 2,022,222 A * 11/1935 Sullivan .................. F21V 29/83 362/364
2,644,556 A * 7/1953 Ledbetter .............. F21V 17/102 49/152
4,240,853 A * 12/1980 Pustka .................. F21V 17/101 362/306
2007/0230193 A1* 10/2007 Engel .................... F21V 17/164 362/365
2013/0120963 A1* 5/2013 Holland .................. F21S 8/026 362/296.07
2014/0307437 A1* 10/2014 Kim ........................ F21V 15/01 362/249.02
2015/0292717 A1* 10/2015 Xu ........................ F21V 17/162 362/382

(Continued)

*Primary Examiner* — Jong-Suk (James) Lee
*Assistant Examiner* — James M Endo

(57) ABSTRACT

A new type of lamp includes a surface frame and a back plate. A first fixing part is arranged on the surface frame along the length direction thereof, and a second fixing part is arranged on the edge of the back plate corresponding to the surface frame; one side of the first fixing part is provided with a first connecting part, and one side of the second fixing part is provided with a second connecting part; the first connecting part and the second connecting part abut against at an adjacent end part in the height direction of the back plate; the cooperating design of the above connecting part combined with the frame-shaped arrangement of the surface frame, enables the back plate to be reliably fixed with the surface frame, while avoiding the tedious operation of conventional bolt locking, and achieving rapid assembly.

10 Claims, 6 Drawing Sheets

(56) References Cited

U.S. PATENT DOCUMENTS

| | | | | |
|---|---|---|---|---|
| 2018/0017218 | A1* | 1/2018 | Ham | F21V 3/02 |
| 2018/0038557 | A1* | 2/2018 | Klafta | F21V 5/04 |
| 2019/0086044 | A1* | 3/2019 | Fang | F21V 11/16 |
| 2020/0256543 | A1* | 8/2020 | Stange | F21V 17/164 |

* cited by examiner

TYPE OF LAMP

CROSS-REFERENCE TO RELATED APPLICATIONS

The present application claims priority to Chinese Patent Application No. 202421237253.6, filed on May 31, 2024, the entire contents of which are incorporated herein by reference.

TECHNICAL FIELD

The present application relates to the field of lamps, in particular to a new type of lamp.

BACKGROUND

The statements herein provide only background information relevant to the present application and do not necessarily constitute prior art.

The lamp panel of a lamp usually includes a back plate and a surface frame, wherein the surface frame is connected to the edge of the back plate for fixing the diffuser plate and other structures, and the back plate is used for installing the light source assembly and other electrical equipment. In the prior art, the connection between the back plate and the surface frame is usually in the form of bolt connection, and a plurality of connection holes need to be prefabricated on the back plate and the surface frame, and the fixation of the two is completed by manual or machine locking, and the overall locking process is relatively complicated.

SUMMARY

Provided is a new type of lamp, including a surface frame and a back plate, wherein a first fixing part is arranged on the surface frame along the length direction thereof, and a second fixing part is arranged on the edge of the back plate corresponding to the surface frame; one side of the first fixing part is provided with a first connecting part, and one side of the second fixing part is provided with a second connecting part; the first connecting part and the second connecting part abut against at an adjacent end part in the height direction of the back plate.

DETAILED DESCRIPTION OF THE EMBODIMENTS

Figure 1:
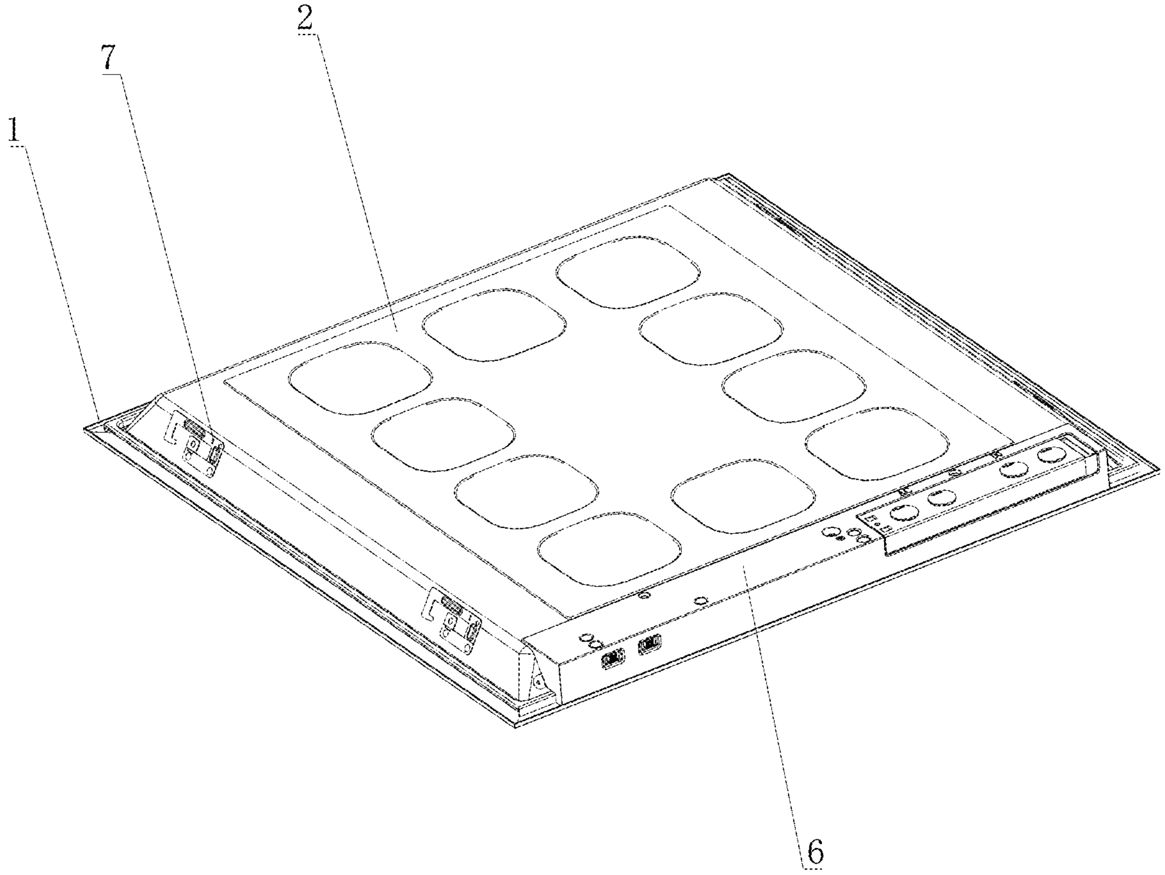
FIG. 1 is a structural schematic diagram of a new type of lamp according to an embodiment.

FIG. 1 illustrates a new type of lamp of the disclosure, including: a surface frame 1, a back plate 2, a power supply assembly 6, and a shock-proof hook 7, wherein the back plate 2 can be mounted on a mounting surface, such as a ceiling, a wall, or the like; the back plate 2 is connected circumferentially to the surface frame 1, and one side of the back plate 2 is connected to the power supply assembly 6, while the other sides are provided with the shock-proof hooks 7. The power supply assembly 6 is used for supplying electrical energy to the electrical equipment in the back plate 2, and the shock-proof hook 7 is used for fixing the back plate 2 after installation, and the light effect of the lamp after installation will be affected by external vibration and shaking.

The back plate 2 is provided with a plurality of recessed structures at the back, and the arrangement of the recessed structures provides sufficient heat dissipation area for the electrical equipment in the back plate 2. The shape of the recessed structures may be rectangular, circular or special rectangular with rounded corners as shown in the drawing, etc., and the design may be adjusted according to the actual design needs from the functional or decorative point of view.

Figure 2:
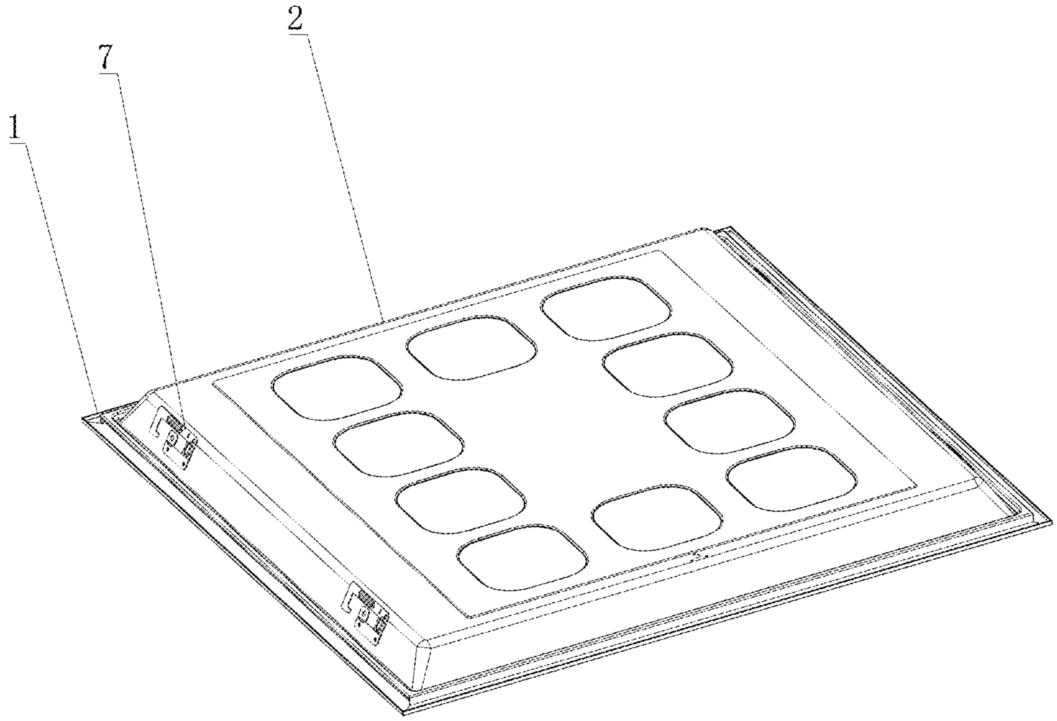
FIG. 2 is a structural schematic diagram when a power supply assembly is not provided on a side of a back plate of the new type of lamp according to an embodiment.

FIG. 2 illustrates a design pattern of another type of lamp, wherein the power supply assembly 6 is not provided on the side of the back plate 2, but is internally arranged inside the back plate 2 or is fixed to other members in the form of external connection so as to improve the overall shape of the lamp; wherein in the form of an external connection to the power supply assembly 6, the overall installation of the lamp can be minimized, especially for installation of lamps at high places, which can be arranged in a portable manner, and the stability of the lamp is greater after being mounted on a mounting surface.

Figure 3:
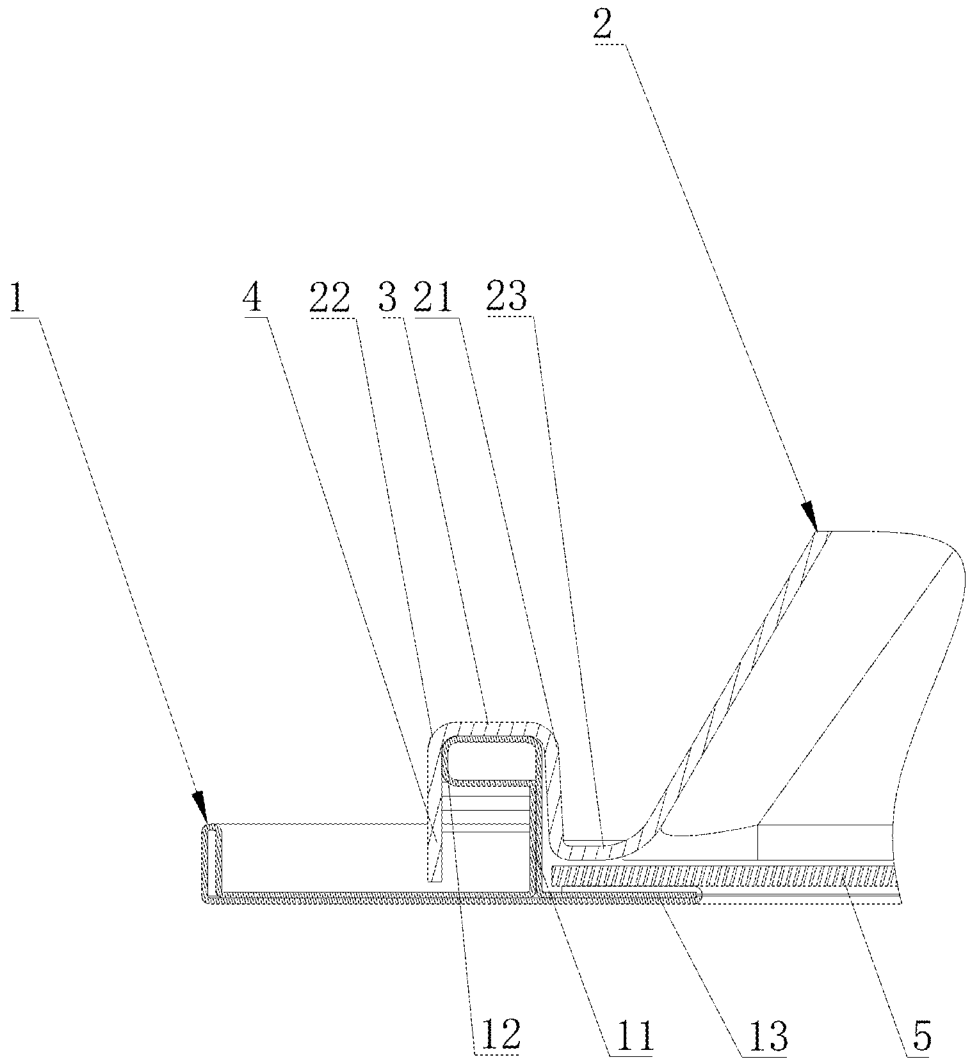
FIG. 3 is a structural schematic diagram of cooperation of a second connecting part in an initial state with a first connecting part of the new type of lamp according to an embodiment.

FIG. 3 illustrates the structure of the back plate 2 and the surface frame 1 before matching, wherein the right side is the back plate 2 and the left side is the surface frame 1. The surface frame 1 includes a first fixing part 11, a first connecting part 12, a surface frame body and an outer edge of the frame, wherein the surface frame body is in a flat plate shape, the side of the surface frame body far away from the back plate 2 is provided with a protruding outer edge of the frame, the surface frame body is protruded with a first fixing part 11, and the first fixing part 11 is connected to the first connecting part 12 on the side facing the outer edge of the frame. The first fixing parts 11 may be arranged continuously or intermittently along the length direction of the surface frame body, specifically, i.e., to form a first fixing part 11 that corresponds to the shape of the surface frame 1 or a first fixing part 11 that is formed on one or more of the plurality of sides of the surface frame 1.

In some embodiments, the surface frame body, the outer edge of the frame, the first fixing part 11, and the first connecting part 12 are all formed by stamping and bending of the same sheet.

The structural design of the surface frame 1 is used for fixing the back plate 2 on the one hand, and plays a decorative role of the lamp on the other hand, so that the shape of the surface frame body is not limited to a flat plate shape, and can be can be designed as a regular or irregular shape with a recessed surface. A dust-accumulating space is formed between the outer edge of the frame connected to one side of the surface frame body and the first fixing part 11, which is able to avoid foreign matter such as dust accumulated on the lamp from falling down directly.

In this drawing, the first fixing part 11 is perpendicular to the frame body of the surface frame 1; in some embodiments, the first fixing part 11 is arranged in a state having an inclination angle between it and the frame body of the surface frame 1.

In this drawing, the first connecting part 12 is in an O shape, which can be formed by extending and bending the first fixing part 11 away from one end of the surface frame body, and the first connecting part 12 and the first fixing part 11 form a P-shaped structure; in some embodiments, the first connecting part 12 may be any other shape in which one end of the first fixing part 11 is extended and bent, or other connecting structure fixed to the first fixing part 11 by bolting, welding, or the like; the cooperation between the second connecting part 22 and the first fixing part 11 can be integrally formed or reprocessed and connected as the first connecting part 12 and the first fixing part 11 described above.

The back plate 2 is provided with a second fixing part 21 and a second connecting part 22 corresponding to the first fixing part 11 and the first connecting part 12 of the surface frame 1, wherein the second fixing part 21 is located on a side of the first fixing part 11 away from the outer edge of the frame, the second fixing part 21 abuts against the first fixing part 11 to form a mounting limit, and the second connecting part 22 includes a fixing structure 3 and a folding edge structure 4, wherein the fixing structure 3 is connected to the second fixing part 21, and the folding edge structure 4 is connected to an end of the fixing structure 3 away from the second fixing part 21.

In this drawing, the folding edge structure 4 at this time is in a state parallel to the first fixing part 11 and abuts against a side of the first connecting part 12. In some embodiments, the folding edge structure 4 may remain inclined relative to the first fixing part 11.

In some embodiments, the new type of lamp further includes a diffuser plate 5, the diffuser plate 5 is typically mounted on a front side of the back plate 2, adjacent to the surface frame 1, for adjusting the diffusion of light emitted from the light source inside the back plate 2. In order to facilitate the mounting and fixing of the diffuser plate 5, an abutting plate 13 is connected to the side of the surface frame body close to the first fixing part 11, and the abutting plate 13 extends towards the side away from the outer edge of the frame, so that the outer edge of the diffuser plate 5 can abut against the abutting plate 13. Correspondingly, the design of the back plate 2 for the diffuser plate 5 and the abutting plate 13 is also matched, wherein the side surface of the back plate 2 is recessed inwardly towards the abutting plate 13 to form an abutting part 23, and the abutting part 23 also abuts against the diffuser plate 5 on the abutting plate 13, which clamps and fixes the diffuser plate 5.

Figure 4:
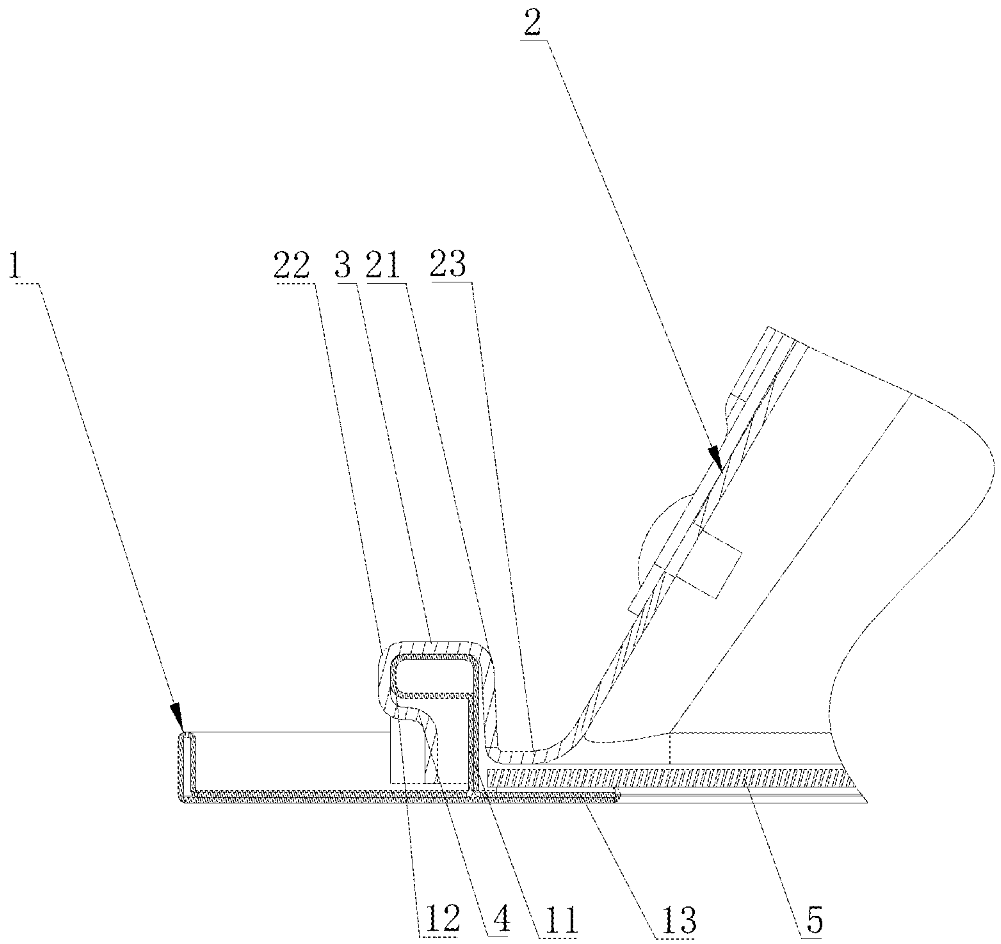
FIG. 4 is a structural schematic diagram of cooperation of the second connecting part in a final state with the first connecting part of the new type of lamp according to an embodiment.

FIG. 4 illustrates a schematic structure of the back plate 2 after mating with the surface frame 1, in which the folding edge structure 4 of the second connecting part 22 is formed against a lower end of the first connecting part 12 by bending in the form of roller pressing or riveting in a lateral direction to the first fixing part 11. At this time, the folding edge structure 4 has at least one section of structure that can abut against the lower end of the first connecting part 12. The upper and lower end parts of the first connecting parts 12 thus formed are wrapped by the second connecting part 22, the upper and lower end parts of the first connecting part 12 abut against the upper and lower end parts of the adjacent second connecting parts 22. At this time, the first connecting part 12 and the second connecting part 22 are combined to form a fixed clamping structure, which ensures a reliable connection between the back plate 2 and the surface frame 1.

In some embodiments, the folding edge structure 4 may be completely bent to a configuration parallel to the lower end of the first connecting part 12 to ensure a stable connection of the back plate 2 and the surface frame 1.

In some embodiments, the folding edge structure 4 can be bent to form a structure having a part of the structure that abutting against the lower end of the first connecting part 12 and a part of the structure that extending and abutting toward the surface frame body, so as to reduce the travel of an acting end of the roller press or the riveting, and to shorten the processing and manufacturing time of the product by controlling the degree of molding and bending of the folding edge structure 4 and the corresponding required working travel of the roller press or the riveting.

Whether it is a fully bent folding edge structure 4 or the folding edge structure 4 having a section of structure that abuts against the lower end of the first connecting part 12 as described above, one end of the folding edge structure 4 can be connected again to the structure of the adjacent surface frame 1, for example, to the first fixing part 11, the surface frame body or the outer edge of the frame by welding, riveting, clamping, bolting, etc., so that the connection between the back plate 2 and the surface frame 1 can be further strengthened.

Figure 5:
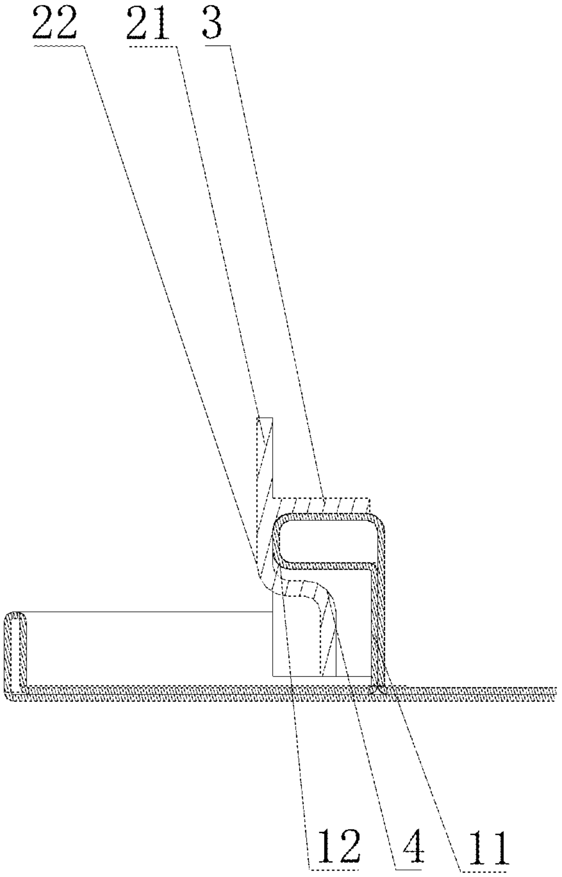
FIG. 5 is a structural schematic diagram of cooperation of the second connecting part with the first connecting part of the new type of lamp according to an embodiment.

FIG. 5 illustrates a cooperation of another back plate 2 and the surface frame 1, wherein the second fixing part 21 of the back plate 2 is located on a side of the first fixing part 11 near the outer edge of the frame. The fixing structure 3 of the second connecting part 22 abuts against the upper end of the first connecting part 12, and the folding edge structure 4 of the second connecting part 22 is bent from an initial state located on the side of the first connecting part 12 by bending means such as roller pressing, punching riveting, etc., to cooperate with the lower end of the first connecting part 12, so as to form an abutment fixing for the upper and lower ends of the first connecting part 12 adjacent to the second connecting part 22. Similarly, the folding edge structure 4 may be formed as a fully bent structure parallel to the surface frame body or as a structure having at least one section abutting against the lower end of the first connecting part 12. The second connecting part 22 and the second fixing part 21 are finally combined to form an F-shaped structure.

Figure 6:
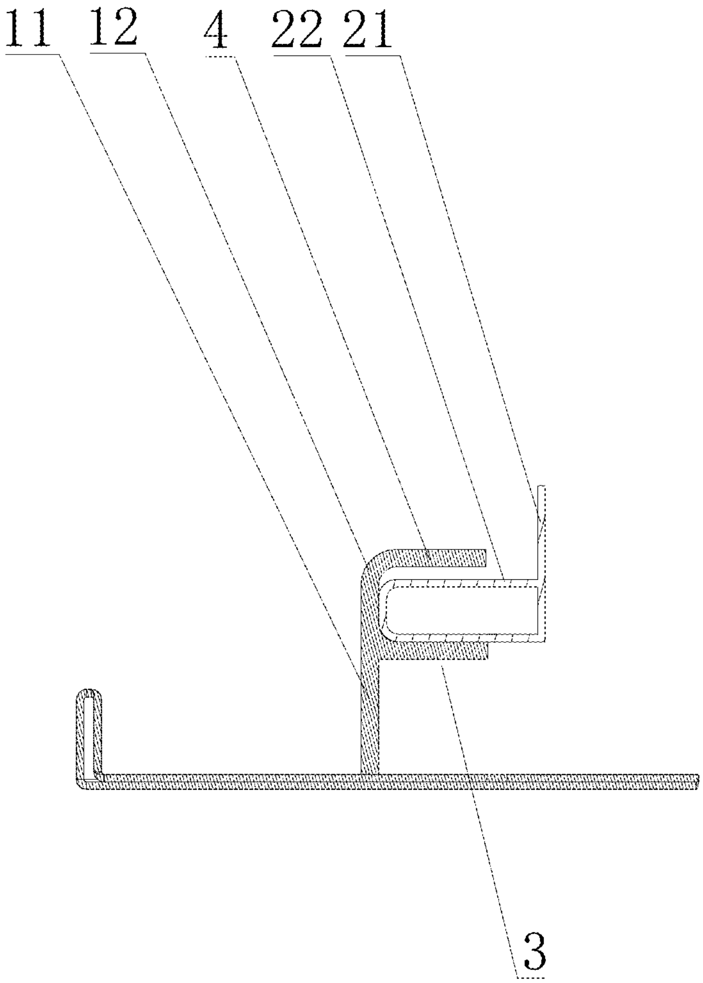
FIG. 6 is a structural schematic diagram of cooperation of the second connecting part with the first connecting part of the new type of lamp according to an embodiment.

FIG. 6 illustrates a cooperation of another back plate 2 and the surface frame 1, wherein the back plate 2 is provided with a second fixing part 21 and a second connecting part 22, at this time, the second connecting part 22 is no longer a member that needs to be bent during installation, and the structure of the second connecting part 22 is fixed as a structure that protrudes from one side of the second fixing part 21. The first fixing part 11 protrudes from the surface frame body, and the first fixing part 11 is provided with a first connecting part 12 along the side away from the outer edge of the frame. The first connecting part 12 includes a fixing structure 3 and a folding edge structure 4, wherein the fixing structure 3 abuts against the lower end of the second connecting part 22, the folding edge structure 4 is bent towards the second fixing part 21 in the direction of rolling, punching and riveting to abut against the upper end of the second connecting part 22. The first connecting part 12 and the first fixing part 11 are finally combined to form an F-shaped structure.

In some embodiments, one end of the folding edge structure 4 of the first connecting part 12 can be bolted, welded, clamped, or the like to the second fixing part 21 or other back plate 2 structures to further strengthen the reliable connection of the surface frame 1 to the back plate 2.

The cooperating design of the first connecting part 12 and the second connecting part 22, combined with the frame-shaped arrangement of the surface frame 1, enables the back plate 2 to be reliably fixed to the surface frame 1, while avoiding the tedious operation of conventional bolt locking, and achieving rapid assembly.

Embodiments described herein include one or more modes known to the present applicant for enforcing the subject matter claimed for protection. Of course, variations of these embodiments will become apparent to those of ordinary skill in the art after reading the above description. The applicant expects those skilled in the art to appropriately adopt this variant, and the applicant wishes to implement the claimed protected subject matter in a manner different from that specifically described herein. Therefore, the claimed protected subject matter includes all modifications and equivalents of the subject matter described in the appended claims, as permitted by applicable law. Moreover, any combination of the above elements in all possible variations thereof is included unless otherwise noted herein or otherwise clearly contradicted by the context.

What is claimed is:

1. A new type of lamp, comprising a surface frame and a back plate, wherein a first fixing part is arranged on the surface frame along a length direction thereof, and a second fixing part is arranged on an edge of the back plate corresponding to the surface frame; one side of the first fixing part is provided with a first connecting part, and one side of the second fixing part is provided with a second connecting part; the first connecting part and the second connecting part abut against at an adjacent end part in a height direction of the back plate;

upper and lower ends of the first connecting part are connected to the first fixing part; the second connecting part comprises a fixing structure and a folding edge structure, the fixing structure abuts against one end of the first connecting part, and the folding edge structure is folded in a state perpendicular to the fixing structure in a manner of being rolled or riveted laterally at the first fixing part to form a structure abutting against the other end of the first connecting part; and a diffuser plate, wherein an abutting plate is extended along an inner edge of the surface frame, an abutting part is recessed in the back plate corresponding to the abutting plate, and a space for inserting the diffuser plate is formed between the abutting plate and the abutting part.

2. The new type of lamp according to claim 1, wherein a side of the first fixing part abuts against a side of the second fixing part.

3. The new type of lamp according to claim 1, further comprising a shock-proof hook provided on both sides of the back plate.

4. The new type of lamp according to claim 1, further comprising a power supply assembly provided on a side of the back plate.

5. The new type of lamp according to claim 1, wherein the first fixing parts are arranged at intervals along the length direction of the surface frame.

6. The new type of lamp according to claim 1, wherein the first fixing part is arranged vertically on the surface frame.

7. The new type of lamp according to claim 1, wherein one end of the folding edge structure is connected to the first fixing part.

8. The new type of lamp according to claim 1, wherein one end of the folding edge structure is connected to the surface frame.

9. The new type of lamp according to claim 1, wherein the first fixing part is integrally formed with the first connecting part, and the second fixing part is integrally formed with the second connecting part.

10. The new type of lamp according to claim 1, wherein the first fixing part is detachably connected to the first connecting part and the second fixing part is detachably connected to the second connecting part.

* * * * *